(12) United States Patent
Takeda et al.

(10) Patent No.: US 11,147,081 B2
(45) Date of Patent: Oct. 12, 2021

(54) USER TERMINAL, RADIO BASE STATION, AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 15/748,275

(22) PCT Filed: Aug. 5, 2016

(86) PCT No.: PCT/JP2016/073143
§ 371 (c)(1),
(2) Date: Jan. 29, 2018

(87) PCT Pub. No.: WO2017/026400
PCT Pub. Date: Feb. 16, 2017

(65) Prior Publication Data
US 2018/0220434 A1  Aug. 2, 2018

(30) Foreign Application Priority Data

Aug. 13, 2015 (JP) .............................. JP2015-159985

(51) Int. Cl.
*H04W 72/12* (2009.01)
*H04W 16/14* (2009.01)
(Continued)

(52) U.S. Cl.
CPC ........... *H04W 72/12* (2013.01); *H04W 16/14* (2013.01); *H04W 72/02* (2013.01); *H04W 74/0808* (2013.01); *Y02D 30/70* (2020.08)

(58) Field of Classification Search
CPC ........... H04W 72/0446; H04W 72/042; H04W 72/0413; H04W 72/0406; H04L 5/14; H04L 5/1469; H04L 5/001
See application file for complete search history.

(56) References Cited

U.S. PATENT DOCUMENTS

2012/0327821 A1   12/2012  Lin et al.
2015/0049653 A1   2/2015   Baghel et al.
(Continued)

FOREIGN PATENT DOCUMENTS

WO         2013137677 A1    9/2013

OTHER PUBLICATIONS

International Search Report issued in corresponding application No. PCT/JP2016/073143 dated Oct. 4, 2016 (3 pages).
(Continued)

*Primary Examiner* — Hassan Kizou
*Assistant Examiner* — Hector Reyes
(74) *Attorney, Agent, or Firm* — Osha Bergman Watanabe & Burton LLP

(57) ABSTRACT

A user terminal communicates with a first cell where a time interval of uplink (UL)/downlink (DL) is dynamically switched, and a second cell where uplink/downlink is switched in a desired time interval. The user terminal includes a transmitting section that transmits an uplink signal; a receiving section that receives a downlink signal; and a control section that controls communication in the transmitting section and in the receiving section. The control section performs a control to not carry out uplink communication in a time interval of the second cell that corresponds to a time interval of downlink communication in the first cell. The control section performs a control to not carry out
(Continued)

downlink communication in a time interval of the second cell that corresponds to a time interval of uplink communication in the first cell.

8 Claims, 14 Drawing Sheets

(51) Int. Cl.
*H04W 72/02* (2009.01)
*H04W 74/08* (2009.01)

(56) References Cited

U.S. PATENT DOCUMENTS

| | | | |
|---|---|---|---|
| 2015/0270933 A1* | 9/2015 | Feng | H04B 7/2656 370/280 |
| 2016/0226650 A1* | 8/2016 | Chen | H04L 5/14 |
| 2016/0242153 A1* | 8/2016 | Chen | H04L 5/0098 |
| 2016/0309468 A1* | 10/2016 | Chen | H04W 4/70 |
| 2016/0373235 A1* | 12/2016 | Oh | H04L 1/18 |
| 2018/0146485 A1* | 5/2018 | Yang | H04L 5/14 |

OTHER PUBLICATIONS

Written Opinion of the International Searching Authority issued in corresponding application No. PCT/JP2016/073143 dated Oct. 4, 2016 (3 pages).
3GPP TS 36.300 V12.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued for European Patent Application No. 16835097.3, dated Feb. 19, 2019 (9 pages).
LG Electronics; "Overall issues on half-duplex operation based TDD CA with different UL-DL configurations"; 3GPP TSG RAN WG1 #68 R1-120421; Dresden, Germany, Feb. 6-10, 2012 (7 pages).
Office Action issued in European Application No. 16835097.3; dated Apr. 17, 2020 (6 pages).
Office Action issued in European Application No. 16835097.3, dated May 21, 2021 (7 pages).

* cited by examiner

| UL-DL CONFIG. | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 2

| SUBFRAME NUMBER | SF#0 | SF#1 | SF#2 | SF#3 | SF#4 | SF#5 | SF#6 | SF#7 | SF#8 | SF#9 |
|---|---|---|---|---|---|---|---|---|---|---|
| Scell (CONFIG.#5) | D | S | U | ✗ | D | D | ✗ | U | ✗ | D |
| Pcell (CONFIG.#1) | D | S | U | U | D | D | S | U | U | D |

FIG. 3

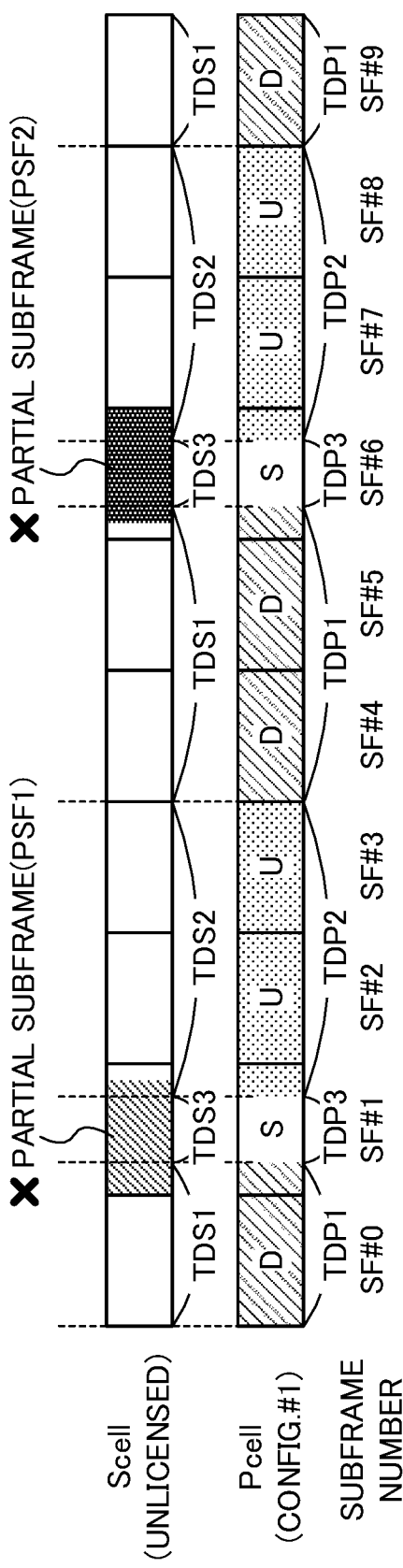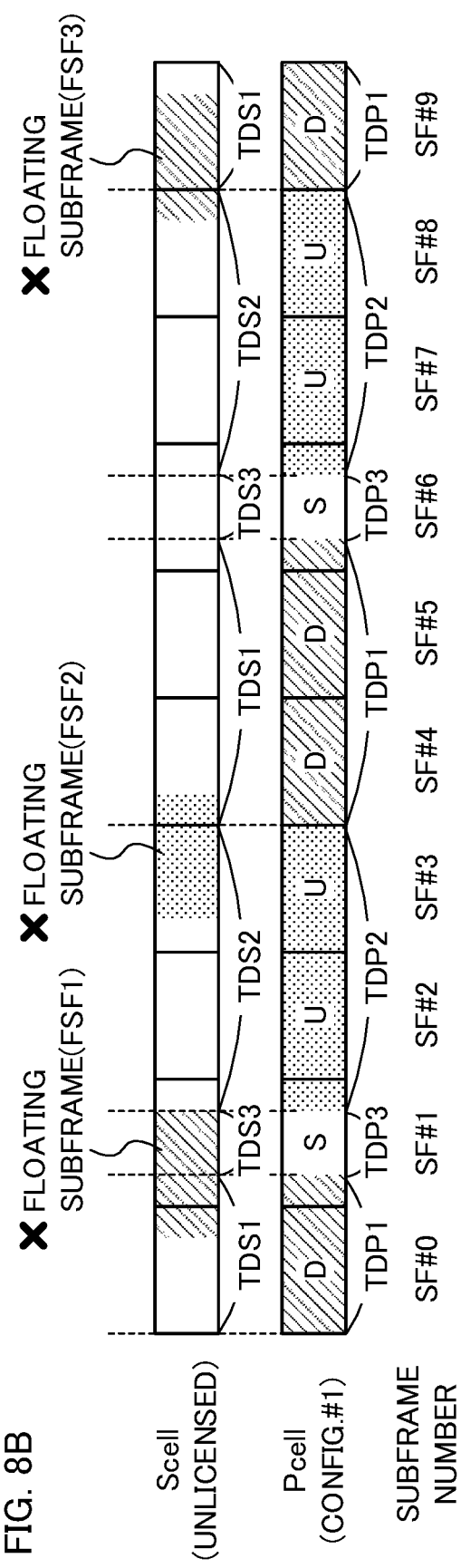

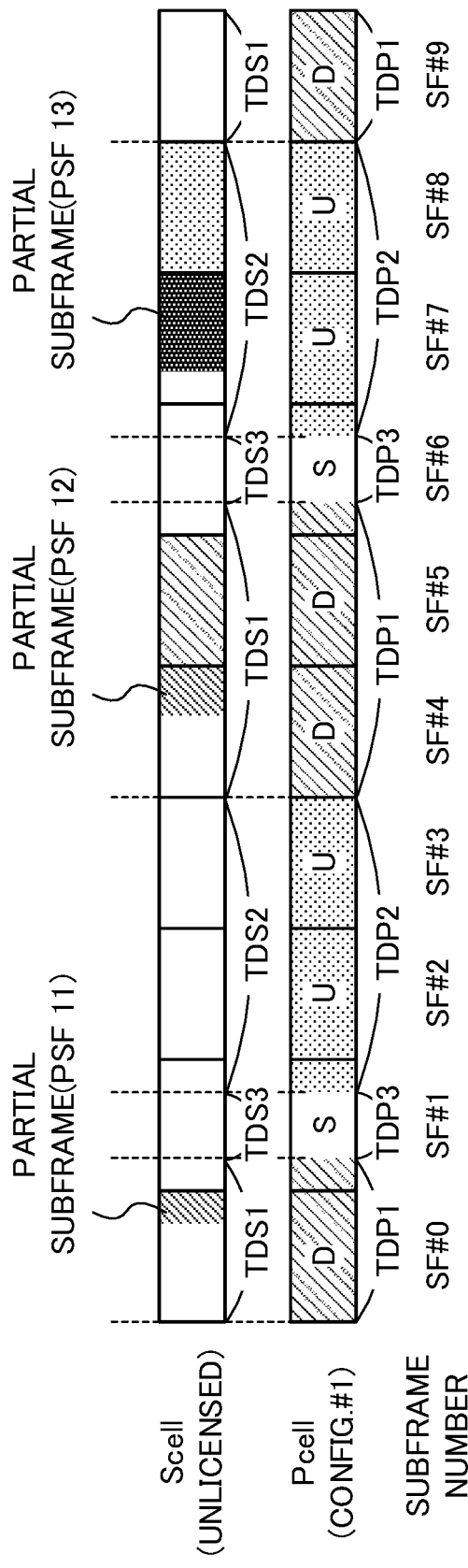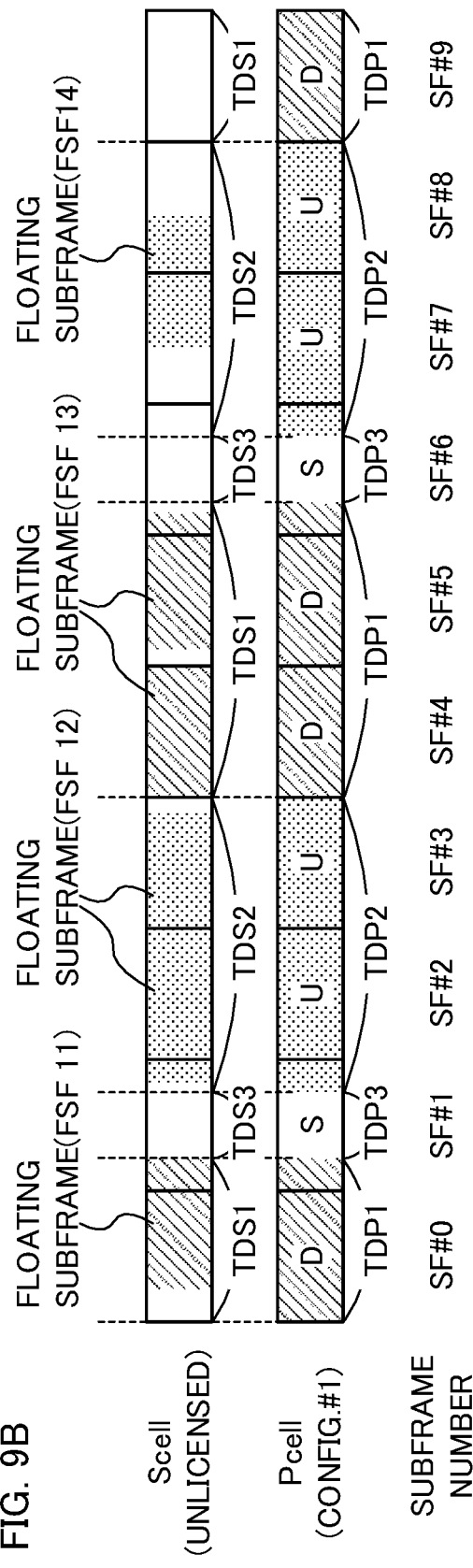

USER TERMINAL, RADIO BASE STATION, AND RADIO COMMUNICATION METHOD

TECHNICAL FIELD

The present invention relates to a user terminal, a radio base station and a radio communication method in a next-generation mobile communication system.

BACKGROUND ART

In a UMTS (Universal Mobile Telecommunications System) network, long-term evolution (LTE) has been standardized for the purpose of further increasing high-speed data rates and providing low delay, etc. (non-patent literature 1). Furthermore, for the purpose of achieving further broadbandization and higher speed, successor systems to LTE which are called LTE advanced (also called "LTE-A") have been studied, and have been formally specified in LTE Rel. 10 through 12.

One example of broadbandization technology in LTE Rel. 10 through 12 is carrier aggregation (CA). With CA, a plurality of fundamental frequency blocks can be integrally communicated. The fundamental frequency blocks in CA are called "component carriers", and corresponds to the LTE Rel. 8 system frequency band.

Furthermore, in LTE Rel. 12, eIMTA (enhanced Interference Mitigation and Traffic Adaptation) is supported for traffic and interference control. eIMTA is technology in which a base station dynamically controls time resources in a time division duplex scheme based on the respective amounts of uplink (UL) traffic and downlink (DL) traffic. Accordingly, eIMTA is also called dynamic TDD.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2".

SUMMARY OF INVENTION

Technical Problem

In eIMTA that is used in LTE Rel. 12, time resources are controlled by selecting a UL-DL configuration to be utilized out of a plurality of predetermined TDD UL-DL configurations. On the other hand, in LAA (Licensed Assisted Access) implemented in LTE Rel. 13, and the implementation of flexible duplex, from Rel. 14 onwards, which can flexibly utilize radio resources as a DL or a UL without the limitations of the operation of the above-mentioned UL-DL configurations, have been studied.

In LAA, it is conceivable to apply carrier sense (also called "LBT (Listen Before Talk)" or "CCA (Clear Channel Assessment")) before transmitting a signal. In a conventional LTE system, since signal allocation is carried out per subframe unit, a time lag may possibly occur in the transmission of signals depending on the timing of the carrier sense. In order to suppress this time lag, the implementation of partial subframe (PS) and floating subframe (FS) is being studied as a new resource allocation method. Partial subframe and floating subframe are resource allocation methods that allocate radio resources at time units smaller than a subframe.

In LTE from Rel. 13 onwards, the communication via CA of cells (CCs), to which a resource allocation method, such as the above-described flexible duplex, partial subframe or floating subframe, etc., that are not prescribed in existing systems, is applied is being studied.

However, for example, if CA is carried out with CCs to which TDD is applied, and with CCs to which a resource allocation method that is not prescribed in an existing system is applied, it is difficult to directly apply iITMA control in an existing system. For example, in an existing system CA (Interband TDD CA), in the case where a user terminal cannot concurrently receive downlink signals and transmit uplink signals of different frequencies (cells or CCs) within the same subframe, the system is configured on the premise that UL-DL configurations set in the CCs are already known. Accordingly, if a resource allocation method that is not prescribed in an existing system is applied to the CCs, there is a risk of communication not being able to be appropriately controlled.

The present invention has been devised in view of the above discussion, and it is an object of the present invention to provide a user terminal, radio base station and radio communication method that can appropriately carry out communication even in the case where CA is carried out including CCs to which a resource allocation method that is not prescribed in an existing system is applied.

Solution to Problem

According to a user terminal of an aspect of the present invention, the user terminal that communicates with a first cell where a time interval of uplink (UL)/downlink (DL) is dynamically switched, and a second cell where uplink/downlink is switched in a desired time interval, includes a transmitting section that transmits an uplink signal; a receiving section that receives a downlink signal; and a control section that controls communication in the transmitting section and in the receiving section. The control section performs a control to not carry out uplink communication in a time interval of the second cell that corresponds to a time interval of downlink communication in the first cell. The control section also performs a control to not carry out downlink communication in a time interval of the second cell that corresponds to a time interval of uplink communication in the first cell.

Technical Advantageous of Invention

According to the present invention, communication can be appropriately carried out even in the case where CA is carried out including CCs to which a resource allocation method that is not prescribed in an existing system is applied.

BRIEF DESCRIPTION OF DRAWINGS

FIG. 2 is an illustrative diagram of a TDD UL-DL configuration that can be used in eIMTA.

FIG. 3 is an illustrative diagram of subframe scheduling in CA, to which TDD in Rel. 12 has been applied.

FIG. 8A is an explanatory diagram of resource allocation of a Pcell and an Scell pertaining to a third embodiment in the case where partial subframe is implemented in LAA; and FIG. 8B is an explanatory diagram of resource allocation of a Pcell and an Scell pertaining to a third embodiment in the case where floating subframe is implemented in LAA.

FIG. 9A is an explanatory diagram of resource allocation of a Pcell and an Scell pertaining to a fourth embodiment in the case where partial subframe is implemented in LAA; and FIG. 8B is an explanatory diagram of resource allocation of a Pcell and an Scell pertaining to a fourth embodiment in the case where floating subframe is implemented in LAA.

DESCRIPTION OF EMBODIMENTS

In CA for successor systems (LTE Rel. 10 through 12) to LTE, the number of CCs that can be configured per user terminal is limited to a maximum of 5. On the other hand, in even further successor systems to LTE, such as LTE Rel. 13 onwards, enhanced carrier aggregation (also called "CA enhanced/enhanced CA, etc.), is being studied, which eases the limit on the number of CCs that can be configured per user terminal to configuring 6 or more CCs (cells).

Figure 1:
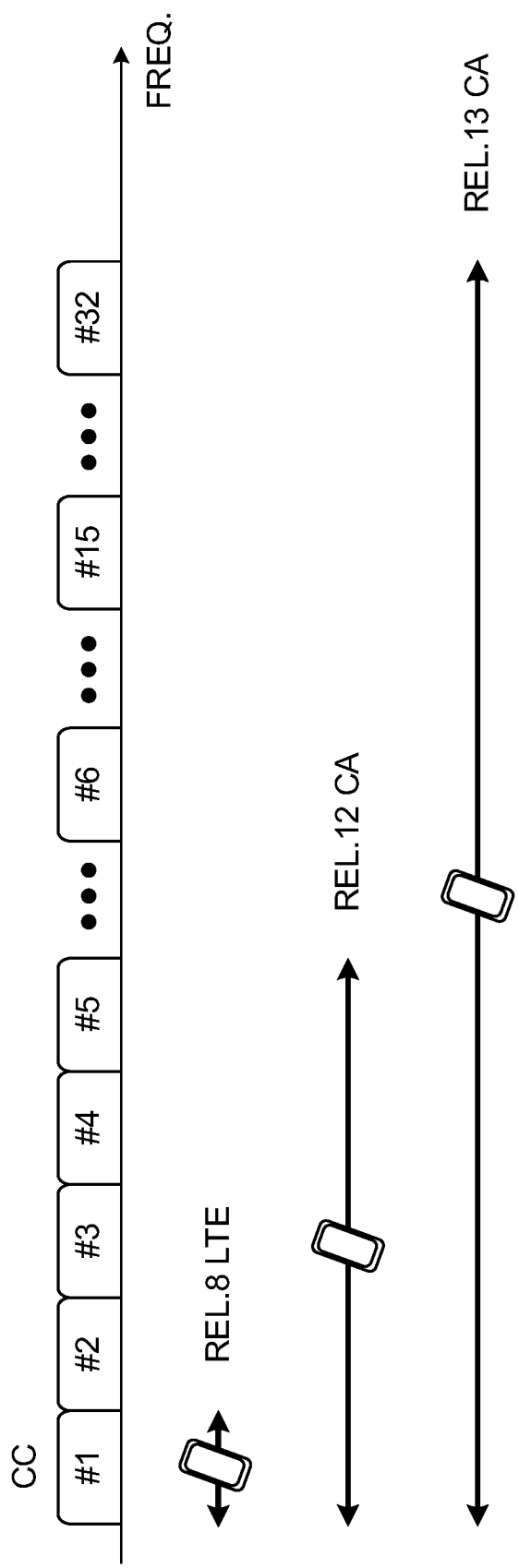
FIG. 1 is an illustrative diagram of carrier aggregation that is studied in LTE Rel. 13.

FIG. 1 is an illustrative diagram of carrier aggregation that is studied in LTE Rel. 13. As illustrated in FIG. 1, enhanced CA assumes, e.g., the combining of 32 component carriers. In this case, communication can be carried out between a radio base station and a user terminal utilizing a maximum of a 640 MHz (20 MHz×32) bandwidth. By utilizing enhanced CA, a more flexible and faster communication can be achieved.

In LTE Rel. 12, eIMTA is supported in order to control traffic and interference. eIMTA is technology that dynamically controls time resources in time division duplex (TDD) scheme, and also is called "dynamic TDD". Hereinbelow, a summary of the control method of eIMTA in LTE Rel. 12 will be described.

In eIMTA, interference between cells can be reduced by dynamically changing the TDD UL-DL configuration (UL-DL config.) per cell. FIG. 2 is an illustrative diagram of a TDD UL-DL configuration that can be used in eIMTA. In FIG. 2, "D" indicates a DL subframe, "U" indicates a UL subframe, and "S" indicates a special subframe. The special subframe is configured by DwPTS (Downlink Pilot Time Slot), a guard period, and UpPTS (Uplink Pilot Time Slot). In eIMTA, it is possible to utilize, e.g., frame configurations (UL-DL configurations 0 through 6) that have different UL/DL subframe ratios such as illustrated in FIG. 2. Each UL-DL configuration is configured of 10 subframes designated by subframe numbers (SF #: SubFrame Number) 0 through 9. Note that the UL-DL configuration may be referred to as a "UL/DL configuration".

In the user terminal, the TDD cell UL/DL ratio, which is applied to eIMTA, is dynamically configured (or reconfigured/renewed) by a PDCCH (Physical Downlink Control Channel). For example, the radio base station carries out dynamic signaling (dynamically-changing signaling) to the user terminal, via the PDCCH, of the UL-DL configuration numbers (e.g., 0 through 6), which are to be used, from the TDD UL-DL configuration of FIG. 2. In the case of CA, the UL/DL ratio can be independently changed per each cell (CC) having different carriers.

Dynamically-changing signaling is notified by a downlink control signal (PDCCH) that includes downlink control information (DCI). Furthermore, before notifying the dynamically-changing signaling, the radio base station (eNB: evolved Node B) notifies the user terminal (UE: User Equipment), by RRC (Radio Resource Signaling), information for receiving dynamically-changing signaling with regard to a specified serving cell.

Furthermore, capability information (capability), which indicates whether or not the user terminal can perform downlink signal (DL signal) reception and uplink signal (UL signal) transmission in the same subframe, is defined in an Inter-band TDD CA. This capability is reported from the user terminal to the radio base station. For example, "Simultaneous Rx-TX capability" is prescribed as a capability, and indicates the operations that are possible in the user terminal in TDD.

If "Simultaneous Rx-TX capability" is True, operation of different UL-DL Configurations between a plurality of CCs which are CA'd is possible without restriction. In order words, an operation in which the CA'd plurality of CCs have a different UL and DL is allowed, and the operation of the UL-DL configuration does not receive any particular restriction.

Whereas, if Simultaneous Rx-TX capability is False, a restriction in the operation of the UL-DL configuration in the CA'd plurality of CCs does occur. Specifically, when the DL and the UL overlap each other between different CCs, i.e., when the DL and the UL overlap each other in the same subframe number (SF) between different CCs, the operation of the Pcell (primary cell) is prioritized.

A specific operation will be herein described using FIG. 3. FIG. 3 is an illustrative diagram of resource allocation of the subframes of the respective CCs in the case where a Pcell and an Scell (secondary cell), that use TDD, are CA'd. FIG. 3 illustrates the case of UL-DL Config.#1 operating in the Pcell, and UL-DL Config.#5 operating in the Scell (see FIG. 2). In order to achieve this allocation, some communication directions per subframe are different between the Pcell and the Scell. For example, in SF #3 and SF #8, the Pcell is "U" and the Scell is "D", and in SF #6, the Pcell is "S" and the Scell is "D".

As indicated in SF #3 and SF #8, when the Pcell is a UL subframe, the user terminal does not need to perform a receiving operation even if the Scell is a DL subframe. Furthermore, as indicated in SF #6, where the Pcell is a special subframe and the Scell is a DL subframe, the user terminal does not need to perform, in the Scell, a receiving operation in a PDSCH (Physical Downlink Shared Channel), an EPDCCH (Enhanced Physical Downlink Control Channel), a PMCH (Physical Multicast Channel), or a PRS (Positioning Reference Signal). Furthermore, as indicated in SF #6, the user terminal does not need to perform a receiving operation in OFDM (Orthogonal Frequency Division Multiplexing) symbols that overlap with the Pcell UpPTS (Uplink Pilot Time Slot), in the Scell special subframe. Note that although not illustrated in FIG. 3, when the Pcell is a DL subframe, the user terminal does not need to perform a transmission operation even if the Scell is a UL subframe.

Figure 4:
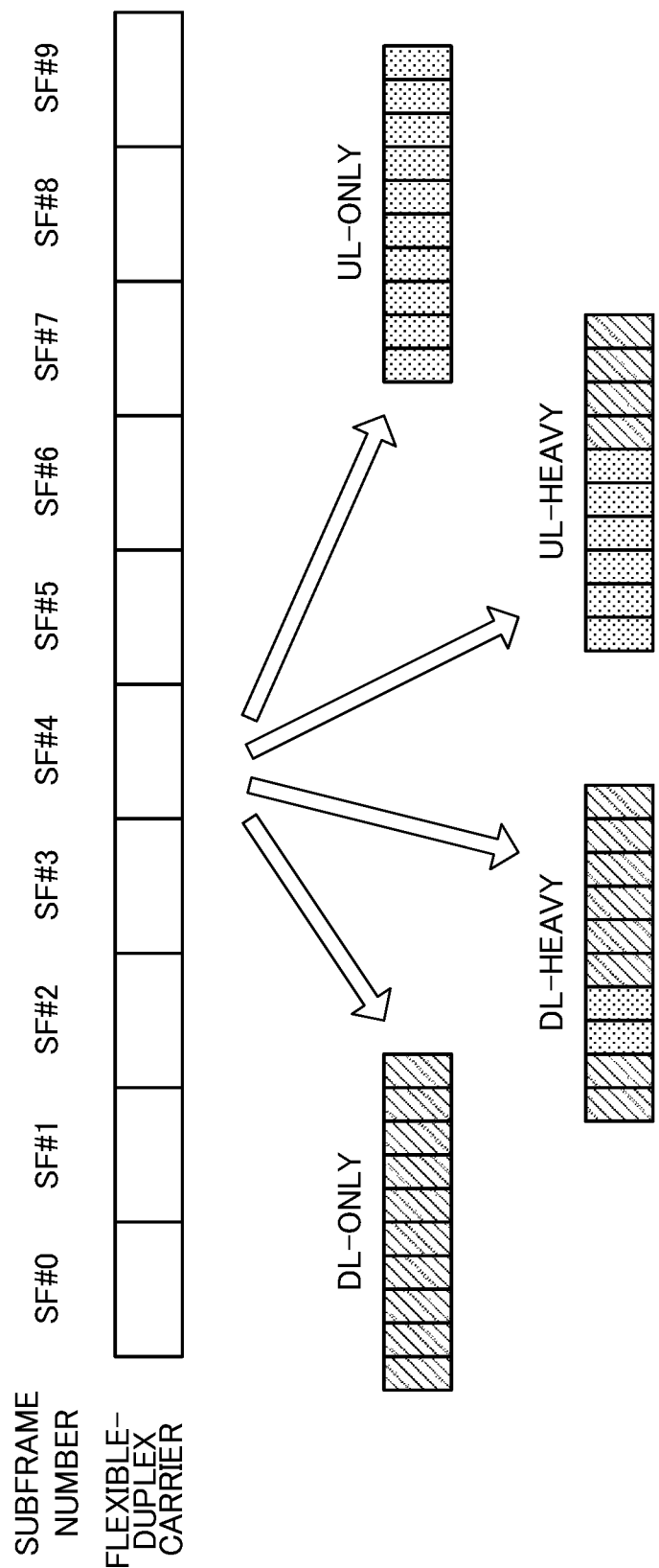
FIG. 4 is an illustrative diagram of resource allocation UL signals and DL-signals in a subframe to which flexible-duplex has been applied.

In Rel. 13 LAA and in 5G which is studied in Rel. 14 onwards, there is a possibility of flexible duplex, which is a new method of allocating radio resources to subframes, being implemented. Flexible duplex is an allocation method which can flexibly utilize a radio resource as a DL or a UL without the restrictions on the operation of the above-described UL-DL configuration. Specifically, flexible duplex does not strictly determine a specific radio resource of a CC for use as a DL or for use as a UL. In other words, a DL subframe or a UL subframe can be configured in accordance with traffic and surrounding environmental conditions (of the channel state, etc.). Accordingly, it is possible to utilize some subframes (frequency domains) as "DL-only", "UL-only" or at a desired ratio of DL to UL (DL-heavy or UL-heavy), so that the subframes can adapt to changes in the channel state (see FIG. 4).

However, in the unlicensed band used in LAA of LTE Rel. 13, since this band is shared with LTE of other operators, Wi-Fi (Registered Trademark), or other systems, an interference control function is necessary. Accordingly, carrier sense (also called LBT: Listen Before Talk/CCA: Clear Channel Assessment, etc.) is used to first measure channel vacancies in advance before carrying out signal transmission.

Hence, the performing of interference control in the same frequency by using carrier sense before signals are transmitted is being studied even for a system (e.g., an LAA system) operating LTE/LTE-A in an unlicensed band. In a carrier in which carrier sense is configured, it is assumed that radio base stations and user terminals of a plurality of systems will share and utilize the same frequency band. A cell that applies carrier sense may be a frequency band having frequency band numbers that can been designated as an unlicensed band that does not need a license, or may be configured so that carrier sense can be performed in an arbitrary frequency. In a cell in which the base station performs carrier sense, unlike in a normal LTE cell, the presence/absence of a signal can change in accordance with communication conditions, etc., with another system or an adjacent cell. Accordingly, it is desirable for information indicating that the base station performs carrier sense in the cell be notified to a user terminal, to which the cell carries out communication. Similarly, also in regard to a cell in which a user terminal performs carrier sense, it is desirable for information for distinguishing the cell with which the user terminal should perform carrier sense to be notified by the base station.

By using carrier sense, interference between LAA and Wi-Fi, and interference between LAA systems can be avoided. Furthermore, even in the case where control of user terminals, which are connectable with respective operators that run LAA systems, is independently carried out, interference can be reduced by performing carrier sense without discerning the control content of the respective user terminals.

For example, in the case where LBT is applied to an LTE system, the transmission point (the LTE-U base station and/or user terminal) listens (carrier sense/LBT/CCA) in the unlicensed band before transmitting a UL signal and/or a DL signal. Furthermore, if another system (e.g., Wi-Fi) or a different LAA transmission point is not detected, communication can be carried out on the unlicensed band.

If the reception power measured by the LBT is less than a threshold value, the transmission point determines that the channel is vacant (LBT-idle) and performs transmission. The term "channel is vacant" is, in other words, a state where the channel is not occupied and can be termed as the "channel is in an idle state", the "channel is clear", or the "channel is free".

In such a case where transmission is carried out after carrier sense is performed, there is a problem with how to start the transmission. In an existing LTE system, control of transmission is carried out per subframe. Therefore, if transmission cannot be carried due to the result of carrier sense, it is necessary for the user terminal to standby for the starting of transmission at the subframe boundary. Accordingly, even if transmission becomes possible upon another carrier sense result, it is conceivable that, depending on the carrier sense timing, a standby for transmission of a maximum of 1 ms may occur. Whereas in a wireless LAN, transmission operations are carried out at a minimum of 16 μs intervals. Hence, it is conceivable that while standing by for transmission, the channel is allowed to be interrupted by another system, and even though carrier sense was performed, the channel becomes occupied so that transmission of signals cannot be carried out.

In order to prevent the channel being interrupted in such a manner, it is necessary transmit signals immediately after the end of LBT_Idle without standing by for the starting of transmission at the subframe boundary. However, an arrangement in which signals transmitted partway through a subframe (e.g., L1/L2 control signals or DL data signals) are received, or in which signals partway through a subframe (e.g., L1/L2 control signals or UL data signals) are transmitted, is not specified in LTE.

Figure 5A:
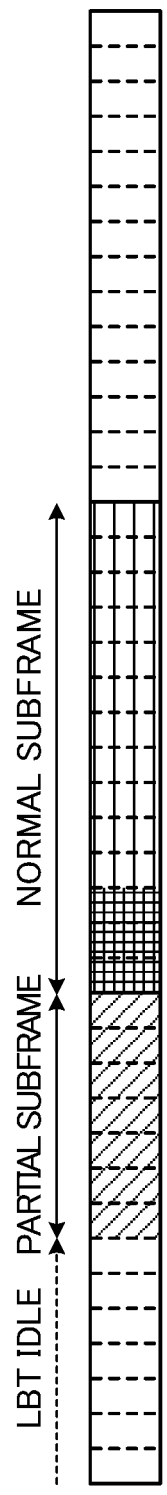
FIG. 5A is an illustrative diagram of resource allocation with OFDM symbols of a partial subframe.

Consequently, implementation of a new resource allocation method, is being studied, called partial subframe and floating subframe, which are resource allocation methods for achieving signal transmission even partway through a subframe. FIG. 5 illustrates diagrams of resource allocation with OFDM (Orthogonal Frequency Division Multiplexing) symbols of a partial subframe and of a floating subframe. As illustrated in FIG. 5, in the partial subframe and the floating subframe, radio resource allocation that is different from that of an existing normal subframe is carried out.

The partial subframe defines a PDSCH (Physical Downlink Shared Channel)/PUSCH (Physical Uplink Shared Channel), etc., that starts reception and transmission partway through a subframe. Although FIG. 5A indicates a case where the partial subframe occupies 7 OFDM symbols, the partial subframe OFDM symbol length is not limited thereto. The partial subframe can be a size selected from 1 OFDM symbol through to 14 OFDM symbols. Hence, by specifying a partial subframe, it is possible to occupy a channel, after performing carrier sense, with higher precision (e.g., a granularity (precision) of around 66 μs) than that of a normal subframe.

Figure 5B:
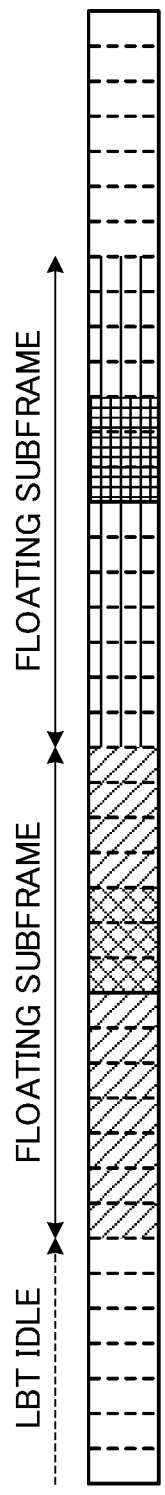
FIG. 5B is an illustrative diagram or resource allocation with OFDM symbols of a floating subframe.

A floating subframe transmits and receives 1 subframe amount of data from partway through a subframe. For example, transmission may be delayed (time-shifted) by the amount by which the transmission of the PDSCH/PUSCH, etc., was delayed, or DL/UL data of 1 subframe amount (14 OFDM symbols) may be transmitted/received by performing a modulo operation on the PDSCH/PUSCH, etc., that has started transmitting/receiving partway through the subframe. In the case where a floating subframe is specified, to which a modulo operation is applied, it is possible to align the timing of the OFDM symbols that transmit the PDCCH with that of a normal subframe, as illustrated in FIG. 5B.

Hence, by implementing a partial subframe or a floating subframe in addition to a conventional normal subframe, it is possible to prevent interruption in LAA by another device during a transmission operation to which carrier sense is applied.

As described above, in LTE from Rel. 13 onwards, the communication via CA of cells (CC), to which a resource allocation method is applied, such as the above-described flexible duplex, partial subframe or floating subframe, etc., that are not prescribed in existing systems, is studied. For example, in CA using a plurality of CCs, the application of an existing LTE TDD cell to a Pcell and the application of a flexible duplex cell (or an unlicensed band) to an Scell has been studied.

However, for example, if CA is carried out with CCs to which TDD is applied, and with CCs to which a resource allocation method that is not prescribed in an existing system is applied, it is difficult to directly apply iITMA control in an existing system. For example, in an existing system CA (Interband TDD CA), in the case where a user terminal cannot concurrently receive downlink signals and transmit uplink signals of different frequencies (cells or CCs) within the same subframe (namely, when Simultaneous Rx-TX capability is False), the system is configured on the premise that the UL-DL configurations set in the CCs are already known. Accordingly, if a resource allocation method that is not prescribed in an existing system is applied to the CCs, there is a risk of communication not being able to be appropriately controlled.

Consequently, the inventors of the present invention concentrated on the cause of interference between cells, etc., in the case of the communication direction (uplink direction or downlink direction) in a Pcell and the communication direction in an Scell being mutually opposite to each other. Furthermore, it was discovered that restricting the transmission of the Scell that transmits in an opposite direction to the communication direction of the Pcell contributes to the reduction in cell interference and improvement in transmission efficiency, thereby arriving at the present invention.

In other words, the essential feature of the present invention is, in a user terminal, to perform a control so as not to carry out uplink communication in a time interval of an Scell (second cell) that corresponds to a time interval of a downlink in a Pcell (first cell), and to perform a control so as not to carry out downlink communication in a time interval of the Scell that corresponds to a time interval of an uplink in the Pcell.

According to the present invention, a specified communication direction in the Scell is restricted in accordance with the communication direction of the Pcell. Accordingly, even in the case where the communication direction is switched at a desired time interval, the performing of a transmission that causes interference between cells, etc., in the Scell can be avoided. Accordingly, communication can be appropriately carried out even in the case where CA is carried out including CCs to which a resource allocation method that is not prescribed in an existing system is applied.

A plurality of embodiments pertaining to the present invention will be described hereinbelow. Note that each below described embodiment indicates a case where the user terminal applies carrier aggregation (CA) to carry out uplink communication and downlink communication between cells formed by a plurality of radio base stations. Furthermore, it is assumed that the user terminal does not have the capability to receive a downlink (DL) signal and to transmit an uplink (UL) signal in the same subframe. In other words, it is assumed that the capability information (simultaneous Rx-Tx capability), which is transmitted from the user terminal to the radio base station, is False. Alternatively, in CA of a combination of an unlicensed band and a licensed band, new capability information is prescribed that indicates the non-capability of receiving a downlink (DL) signal and transmitting an uplink (UL) signal in the same subframe; this non-capability can be indicated as "False".

Note that in each below-described embodiment, for the sake of convenience of explanation, the case where TDD UL-DL config.#1 is applied to the Pcell will be described. However, the present invention is not limited to TDD UL-DL config.#1 being applied to the Pcell; appropriate modifications are possible. For example, UL-DL config.#0, and #2 through #6, etc., can be applied.

In addition, the below embodiments are described in regard to the case where one Pcell and one Scell are allocated. However, the number of Scells that the user terminal carries out communication with is not limited thereto; appropriate modifications are possible. For example, a case may be assumed in which a Pcell and two or more Scells are allocated.

First Embodiment

Figure 6:
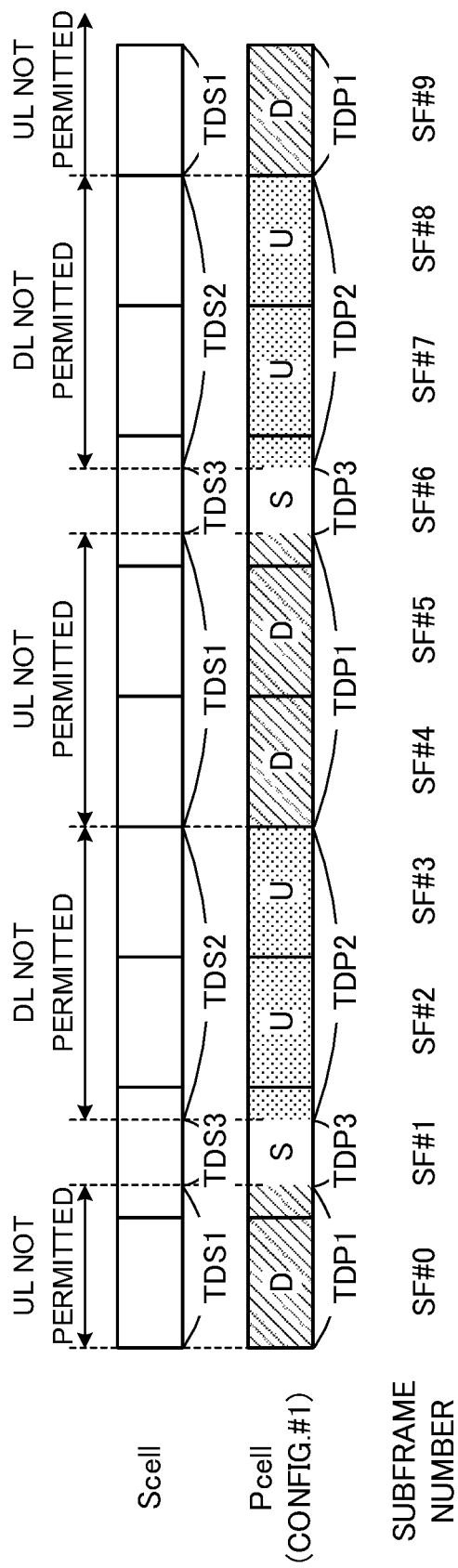
FIG. 6 is an explanatory diagram of resource allocation of a Pcell and an Scell pertaining to a first embodiment.

In regard to the first embodiment, a resource allocation in an Scell of a user terminal will be herein described for the case where the time interval of uplink/downlink in the Pcell can be dynamically switched by the UL-DL Config., and a desired time interval of uplink/downlink in the Scell can be switched. FIG. 6 is an explanatory diagram of resource allocation of a Pcell and an Scell pertaining to the first embodiment.

Note that in the first embodiment, one time interval is defined as an interval of a continuous signal in the same communication direction (uplink direction or downlink direction) or an interval in which communication is not carried out. For example, in the Pcell, one time interval TDP1 is configured by SF #0 and part of SF #1 (DwPTS) where a continuous downlink signal is present. Furthermore, one time interval TDP2 is configured by part of SF #1 (UpPTS), SF #2 and SF #3 where a continuous uplink signal is present. Furthermore, one time interval TDP3 is configured by part of SF #1 (guard interval) where communication is not carried out. Note that the time intervals are configured in the same manner in each below-described embodiment.

In the first embodiment, as illustrated in FIG. 6, the time interval TDS1 of the Scell, which corresponds to the time interval TDP1 of the downlink of the Pcell, restricts uplink communication (UL Not Permitted). In time interval TDS1, the user terminal is controlled not carry out uplink communication. In such a case, in time interval TDS1, the user terminal does not need to transmit OFDM symbols included in a desired subframe of the Scell.

Similarly, the time interval TDS2 of the Scell, which corresponds to the time interval TDP2 of the uplink of the Pcell, restricts downlink communication (DL Not Permitted). In time interval TDS2, the user terminal is controlled not carry out downlink communication. In such a case, in time interval TDS2, the user terminal does not need to transmit OFDM symbols included in a desired subframe of the Scell.

Hence, by controlling the transmitting/receiving operations of the user terminal in the Scell, a specified communication direction in the Scell is restricted in accordance with the communication direction of the Pcell. Accordingly, even in the case where the communication direction is switched in the Scell at a desired time interval, the performing of a communication that causes interference between cells, etc., in the Scell can be avoided. Accordingly, communication can be appropriately carried out even in the case where CA is carried out including CCs to which a resource allocation method (e.g., flexible duplex, partial subframe, or floating subframe) that is not prescribed in an existing system is applied.

Furthermore, in the first embodiment, communication in the specified communication direction is restricted in the time interval TDS3 of the Scell that corresponds to the time interval TDP3, of the Pcell, in which communication is not carried out. In such a case, the user terminal assumes that the time interval TDS3 of the Scell is not used for communication in the specified communication direction. Accordingly, a receiving/transmitting process of signals can be avoided in the time interval TDS3 of the Scell corresponding to the time interval TDP3 of the Pcell, in which Pcell communication is not carried out. Consequently, it is possible to simplify the processes that are performed in the user terminal.

Second Embodiment

Figure 7:
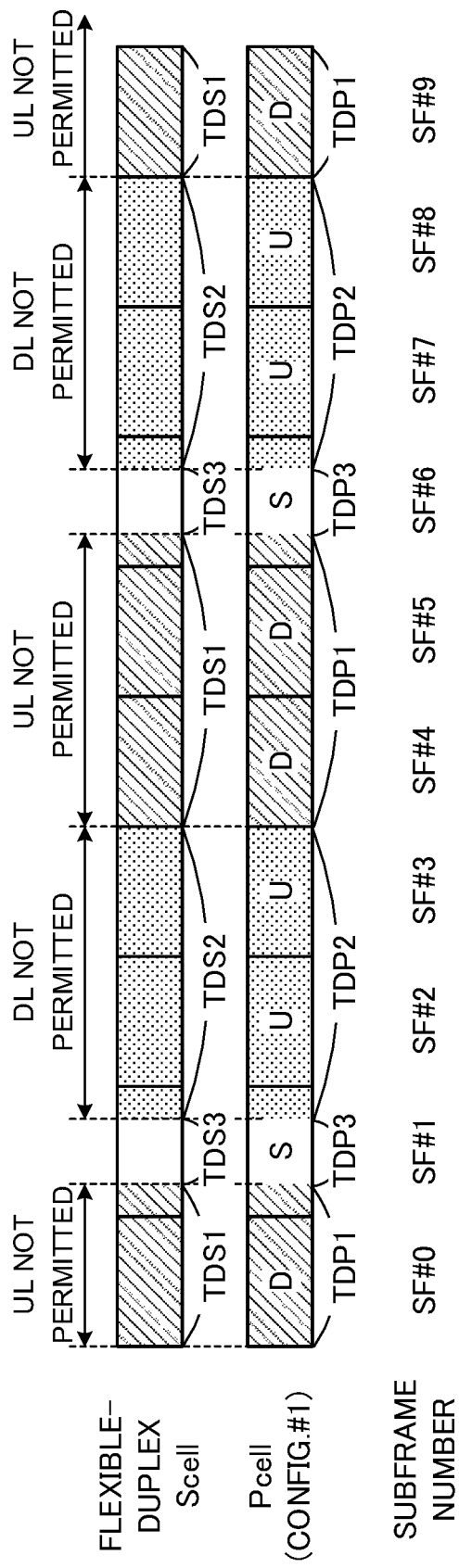
FIG. 7 is an explanatory diagram of resource allocation of a Pcell and an Scell pertaining to a second embodiment.

In regard to the second embodiment, a resource allocation in an Scell of a user terminal will be herein described for the case where the time interval of the uplink (UL)/downlink (DL) in a Pcell can be dynamically switched by the UL-DL Config., and where flexible-duplex is applied in the Scell. FIG. 7 is an explanatory diagram of resource allocation of the Pcell and the Scell pertaining to the second embodiment.

In the second embodiment, as illustrated in FIG. 7, only downlink communication is permitted in the time interval TDS1 of the Scell, which corresponds to the time interval TDP1 of the downlink of the Pcell. In this case, the user terminal assumes that this time interval TDS1 is only used for downlink communication, and can perform a control so that uplink communication is not carried out.

Similarly, in the second embodiment, only uplink communication is permitted in the time interval TDS2 of the Scell, which corresponds to the time interval TDP2 of the uplink of the Pcell. In this case, the user terminal assumes that this time interval TDS2 is only used for uplink communication, and can perform a control so that downlink reception related operations, such as a quality measurement operation or a control-signal receiving operation, etc., are not carried out.

In this manner, the user terminal can assume the communication direction that can be used in the Scell in accordance with the communication direction of the Pcell. Hence, even in the case where the communication direction is switched at a desired time interval, a time interval can be specified in which uplink or downlink communication can be carried out in the Scell. Consequently, communication can be carried out while effectively utilizing the radio resources of the Scell.

Note that the second embodiment is the same as the first embodiment in regard to the control to not perform uplink communication in the time interval TDS1 of the Scell in which uplink communication is restricted, and in regard to the control to not perform downlink communication in the time interval TDS2 of the Scell in which downlink communication is restricted. Furthermore, the second embodiment is the same as the first embodiment in regard to communication in a specified direction being restricted in the time interval TDS3 of the Scell.

Third Embodiment

In regard to the third embodiment, resource allocation in an Scell of a user terminal will be herein described for the case where, the time interval of uplink/downlink in the Pcell can be dynamically switched by the UL-DL Config., and LAA is applied in the Scell. FIG. 8 is an explanatory diagram of resource allocation of the Pcell and the Scell pertaining to the third embodiment. In particular, FIG. 8A illustrates a case where partial subframes are implemented in LAA, and FIG. 8B illustrates a case where floating subframes are implemented in LAA. Note that in the third embodiment, confirmation is carried out as to whether or not the channel is vacant by performing carrier sense before signal transmission in the Scell.

The third embodiment is the same as the first embodiment in regard to the user terminal being controlled to not perform uplink communication in the time interval TDS1 of the Scell in which uplink communication is restricted, and being controlled to not perform downlink communication in the time interval TDS2 of the Scell in which downlink communication is restricted. Furthermore, the third embodiment is the same as the first embodiment in regard to communication in a specified direction being restricted in the time interval TDS3 of the Scell. Furthermore, the third embodiment is the same as the second embodiment in regard to downlink communication being permitted in the time interval TDS1 of the Scell that corresponds to the time interval TDP1 of the downlink of the Pcell, and in regard to uplink communication being permitted in the time interval TDS2 of the Scell that corresponds to the time interval TDP2 of the uplink of the Pcell.

FIG. 8A illustrates a case where a partial subframe (PSF1, PSF2) is allocated to the time interval TDS3 in the Scell which corresponds to the time interval TDP3 in the Pcell. Note that PSF1 is a downlink partial subframe, and PSF2 is an uplink partial subframe. Furthermore, FIG. 8B illustrates a case where a floating subframe (FSF1) is allocated to a time interval that corresponds to the time interval TDP3 in the Pcell, and where a floating subframe (FSF2, FSF3) is allocated to a time interval that extends over the time interval TDP1 and the time interval TDP2 in the Pcell. Note that FSF1 and FSF3 are downlink floating subframes, and FSF2 is an uplink floating subframe.

As mentioned above, the time interval TDS3 in the Scell is restricted to a specified communication direction. Therefore, the user terminal can assume that a partial subframe (PSF1, PSF2) or a floating subframe (FSF1) is not scheduled in the time interval that includes the time interval TDS3 of the Scell. Accordingly, even if a partial subframe or a floating subframe is implemented, a receiving/transmitting process of signals can be avoided in the time interval TDS3 of the Scell corresponding to the time interval TDP3 of the Pcell in which Pcell communication is not carried out. Consequently, it is possible to simplify the processes that are performed in the user terminal, and power consumption can be reduced by limiting the time intervals in which receiving/transmitting operations are carried out.

Furthermore, as described above, only downlink communication is permitted in the time interval TDS1 of the Scell. Whereas, only uplink communication is permitted in the time interval TDS2 of the Scell. Therefore, the user terminal can assume that a floating subframe (FSF2, FSF3) that extends over the time interval TDS1 and the time interval TDS2 of the Scell is not scheduled. Accordingly, even if a partial subframe or a floating subframe is implemented, a receiving/transmitting process of signals can be avoided in a time interval which includes a timing at which the communication direction of the Pcell is switched. Consequently, it is possible to simplify the processes that are performed in the user terminal, and power consumption can be reduced by limiting the time intervals in which receiving/transmitting operations are carried out.

Fourth Embodiment

In regard to the fourth embodiment, a resource allocation in an Scell of a user terminal will be herein described for the case where the time interval of uplink/downlink in the Pcell can be dynamically switched by the UL-DL Config., and LAA is applied in the Scell. FIG. 9 is an explanatory diagram of resource allocation of the Pcell and the Scell pertaining to the fourth embodiment. In particular, FIG. 9A illustrates a case where partial subframe is implemented in LAA, and FIG. 9B illustrates a case where floating subframe is implemented in LAA. Note that in the fourth embodiment, confirmation is carried out as to whether or not the channel is vacant by performing carrier sense before signal transmission in the Scell.

The fourth embodiment is the same as the second embodiment in regard to only downlink communication being permitted in the time interval TDS1 of the Scell, which corresponds to the time interval TDP1 of the downlink of the Pcell, and in regard to only uplink communication being permitted in the time interval TDS2 of the Scell, which corresponds to the time interval TDP2 of the uplink of the Pcell.

FIG. 9A illustrates a case where a partial subframe (PSF11, PSF12) is allocated to the time interval TDS1 in the Scell, which corresponds to the time interval TDP1 in the Pcell, and where a partial subframe (FSF13) is allocated to the time interval TDS2 in the Scell, which corresponds to the time interval TDP2 in the Pcell. Note that PSF11 and PSF12 are a downlink partial subframes, and PSF13 is an uplink partial subframe. Furthermore, FIG. 9B illustrates a case where a floating subframe (FSF11 and FSF13) is allocated to the time interval TDS1 of the Scell that corresponds to the time interval TDP1 in the Pcell, and where a floating subframe (FSF12, FSF14) is allocated to the time interval TDS2 of the Scell that corresponds to the time interval TDP2 in the Pcell. Note that FSF11 and FSF13 are downlink floating subframes, and FSF12 and FSF14 are uplink floating subframes.

As mentioned above, downlink communication is permitted in the time interval TDS1 in the Scell. Therefore, the user terminal has to be able to receive a partial subframe (PSF11, PSF12) or a floating subframe (FSF11, FSF13) that is scheduled to the time interval TDS1 in the Scell. Furthermore, uplink communication is permitted in the time interval TDS2 in the Scell. Therefore, the user terminal has to be able to transmit a partial subframe (PSF13) or a floating subframe (FSF12, FSF 14) that is scheduled to the time interval TDS2 in the Scell. Accordingly, even if a partial subframe or a floating subframe is implemented, uplink or downlink communication can be carried out in part or all of the time interval in the Scell that corresponds to the time interval of the uplink or downlink in the Pcell. Consequently, communication can be carried out with a reduced cell interference with the Pcell while effectively utilizing the radio resources of the Scell.

The above-described first through fourth embodiments each assume the case where the user terminal allocates resources of the Scell based on the resource allocation of the Pcell; however, the present invention is not limited thereto. For example, the radio base station may schedule resources as assumed by the user terminal.

According to the above first through fourth embodiments, a half-duplex operation can be maintained while combining with a flexible duplex operation. Furthermore, according to such a configuration, since communication can be carried out using TDD, communication can be carried out with a user terminal having a simpler configuration since there is no need for an RF filter for avoiding interference between transmission/reception frequencies compared to a user terminal that uses FDD.

(Configuration of Radio Communication System)

The following description concerns the configuration of a radio communication system according to an embodiment of the present invention. In this radio communication system, a radio communication method is adopted to which the above-described examples are applied. Furthermore, each communication method can be applied independently, or in combination.

Figure 10:
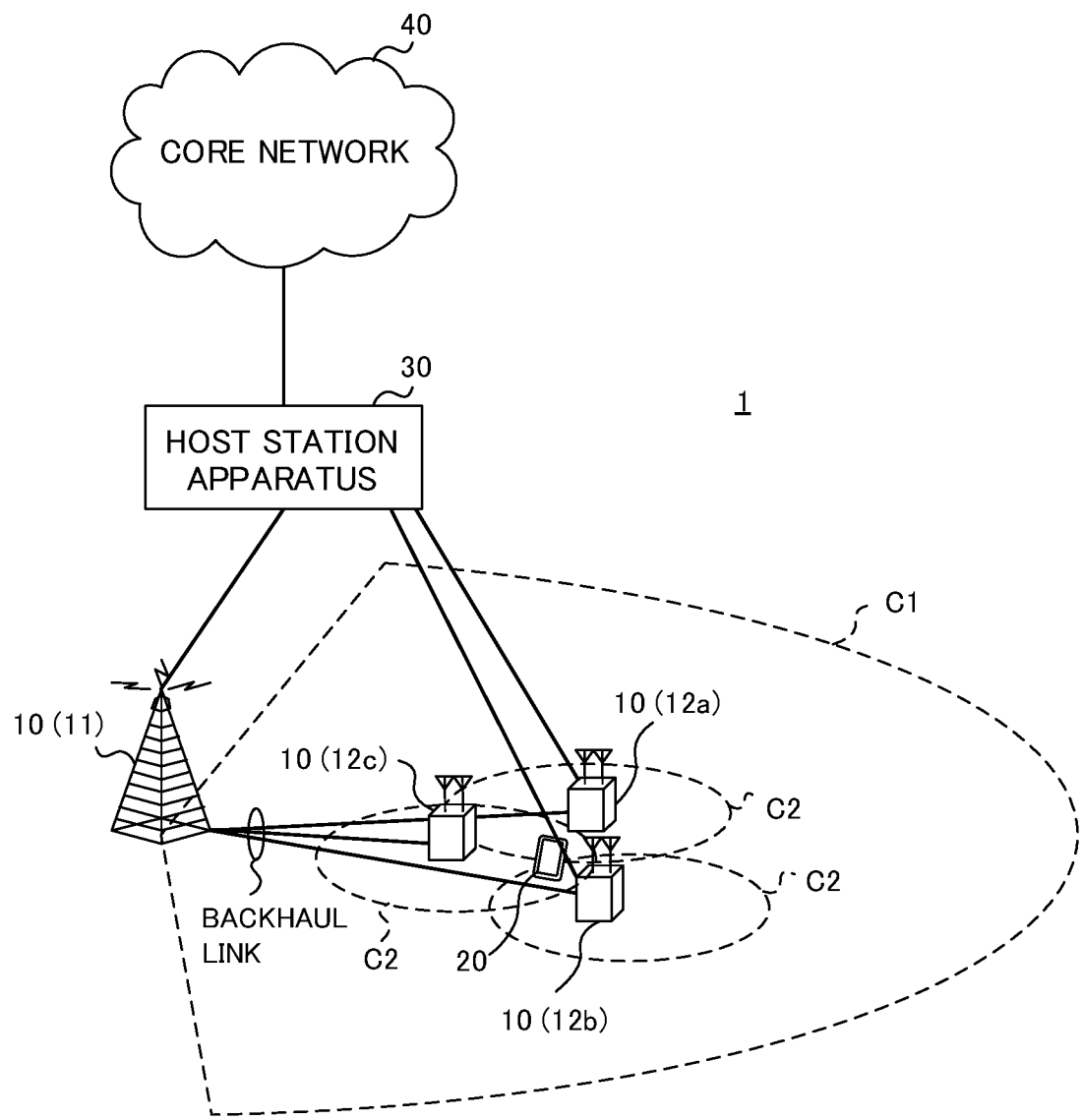
FIG. 10 is an illustrative diagram of a schematic configuration of a radio communication system of according to an illustrated embodiment of the present invention.

FIG. 10 illustrates an example of a schematic configuration of the radio communication system according to an embodiment of the present invention. The radio communication system illustrated in FIG. 10 is, for example, a system that includes an LTE system, SUPER 3G and LTE-A system, etc. Carrier aggregation (CA) and/or dual connectivity (DC), which are an integration of a plurality of component carriers (CCs), can be applied to this radio communication system. Furthermore, the plurality of CCs include licensed band CCs which use a licensed band and unlicensed band CCs which use an unlicensed band. Note that this radio communication system may also be called IMT-Advanced, 4G, or 5G FRA (Future Radio Access), etc.

The radio communication system 1 illustrated in FIG. 10 includes a radio base station 11 which forms a macro cell C1, and a radio base station 12 (12a through 12c) provided within the macro cell C1 and forms a small cell C2 that is smaller than the macro cell C1. Furthermore, a user terminal 20 is provided within the macro cell C1 and the small cell C2.

The user terminal 20 can connect both to the radio base station 11 and the radio base station 12. It is assumed that the user terminal 20 concurrently uses the macro cell C1 and the small cell C2 that uses different frequencies via CA or DC. Furthermore, the user terminal 20 can apply CA using at least two CCs (cells), and can utilize six or more CCs.

Communication between the user terminal 20 and the radio base station 11 can be carried out using a carrier (called an "existing carrier", "Legacy carrier", etc.) having a narrow bandwidth in a relatively low frequency band (e.g., 2 GHz). Whereas, communication between the user terminal 20 and the radio base station 12 may be carried out using a carrier having a wide bandwidth in a relative high frequency band (e.g., 3.5 GHz, 5 GHz, etc.), or using the same carrier as that with the radio base station 11. A fixed-line connection (e.g., optical fiber, or X2 interface, etc.) or a wireless connection can be configured between the radio base station 11 and the radio base station 12 (or between two radio base stations 12).

The radio base station 11 and each radio base station 12 are connected to a host station apparatus 30, and are connected to the core network 40 via the host station apparatus 30. The host station apparatus 30 includes, but is not limited to, an access gateway apparatus, a radio network controller (RNC), and a mobility management entity (MME), etc.

Furthermore, each radio base station 12 may be connected to the host station apparatus 30 via the radio base station 11.

Note that the radio base station 11 is a radio base station having a relatively wide coverage, and may be called a macro base station, an aggregation node, eNB (eNodeB) or a transmission/reception point. Furthermore, the radio base station 12 is a radio base station having local coverage, and may be called a small base station, a micro base station, a pico base station, a femto base station, HeNB (Home eNodeB), RRH (Remote Radio Head), or a transmission/reception point, etc. Hereinafter, the radio base stations 11 and 12 will be generally referred to as "a radio base station 10" in the case where they are not distinguished. Each user terminal 20 is compatible with each kind of communication scheme such as LTE, LTE-A, etc., and also includes a mobile communication terminal and a fixed communication terminal.

In the radio communication system 1, OFDMA (Orthogonal Frequency Division Multiple Access) is applied to the downlink and SC-FDMA (Single-Carrier Frequency Division Multiple Access) is applied to the uplink as radio access schemes. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system bandwidth into bands formed with one or continuous resource blocks, and allowing a plurality of terminals to use mutually different bands. Note that the uplink and downlink radio access schemes are not limited to the above combinations.

In the radio system, TDD may be applied to the uplink or the downlink. The radio system may apply flexible duplex in addition to UL-DL configuration, which is a conventional TDD allocation method. In flexible duplex, radio resources can be flexibly used as a DL or a UL.

In the radio communication system 1, a downlink shared channel (PDSCH: Physical Downlink Shared Channel) that is shared by each user terminal 20, a broadcast channel (PBCH: Physical Broadcast channel), and an L1/L2 control channel, etc., are used as downlink channels. User data and higher layer control information, and a predetermined SIB (System Information Block) are transmitted on the PDSCH. Furthermore, an MIB (Master Information Block), etc., is transmitted on the PBCH.

Furthermore, in the radio communication system 1, radio resources can be allocated not only by conventional subframe units, as a scheduling unit for the radio resources, but only by units that have a shorter time length than that of a subframe. For example, allocation of radio resources may be carried out by OFDM symbol units. In such a case, for example, a partial subframe or a floating subframe, etc., may be allocated. Furthermore, for example, also in regard to SC-FDMA symbols, allocation of radio resources may be carried out thereby in a manner similar to OFDM symbols.

The downlink L1/L2 control channel includes a PDCCH (Physical Downlink Control Channel), an EPDCCH (Enhanced Physical Downlink Control Channel), a PCFICH (Physical Control Format Indicator Channel), and a PHICH (Physical Hybrid-ARQ Indicator Channel), etc. Downlink control information (DCI), etc., which includes PDSCH and PUSCH scheduling information, is transmitted by the PDCCH. The number of OFDM symbols used in the PDCCH is transmitted by the PCFICH. A HARQ delivery acknowledgement signal (ACK/NACK) for the PUSCH is transmitted by the PHICH. An EPDCCH that is frequency-division-multiplexed with a PDSCH (downlink shared data channel) can be used for transmitting the DCI in the same as the PDCCH.

Furthermore, a downlink reference signal includes a cell-specific reference signal (CRS), a channel state information reference signal (CRS-RS), and a demodulation reference signal (DM-RS), etc.

In the radio communication system 1, an uplink shared channel (PUSCH: Physical Uplink Shared Channel) that is shared by each user terminal 20, an uplink control channel (PUCCH: Physical Uplink Control Channel), and a random access channel (PRACH: Physical Random Access Channel), etc., are used as uplink channels. The PUSCH is used to transmit user data and higher layer control information. Furthermore, the PUCCH is used to transmit downlink radio quality information (CQI: Channel Quality Indicator), and delivery acknowledgement signals (HARQ-ACK). A random access preamble (RA preamble) for establishing a connection with a cell is transmitted by the PRACH.

<Radio Base Station>

Figure 11:
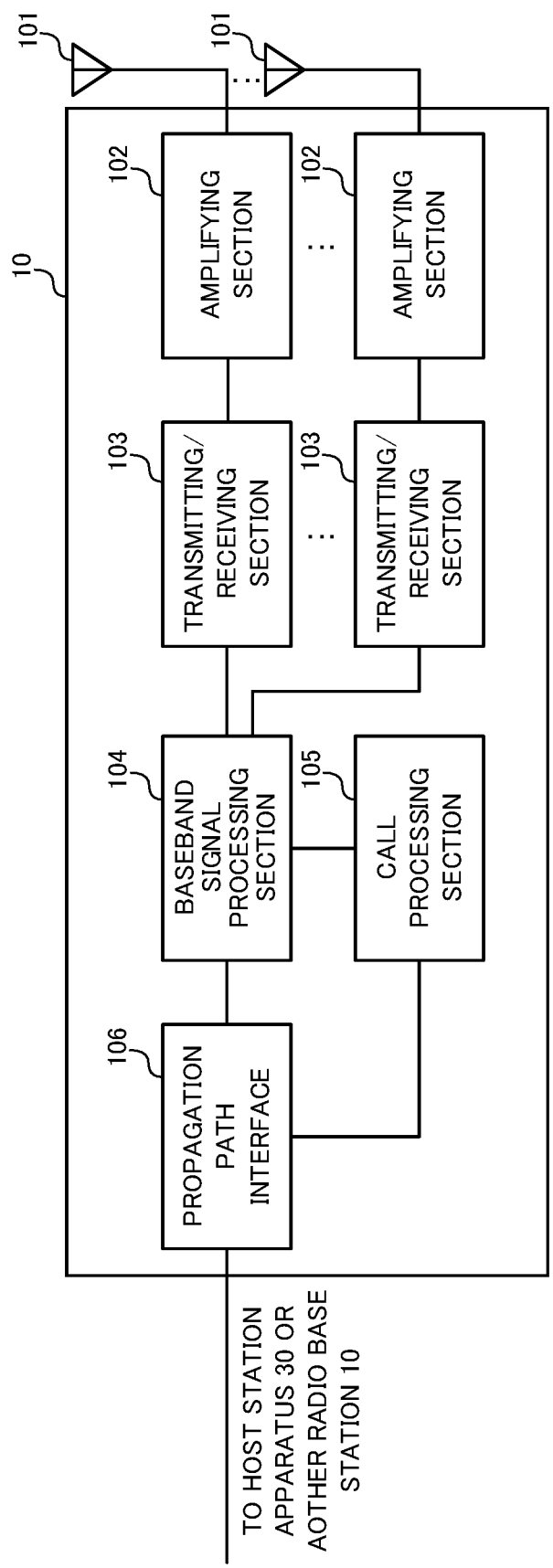
FIG. 11 is an illustrative diagram of an overall configuration of a radio base station according to the illustrated embodiment of the present invention.

FIG. 11 is a diagram illustrating an overall configuration of the radio base station according to the embodiment of the present invention. The radio base station 10 is configured of a plurality of transmission/reception antennas 101, amplifying sections 102, transmitting/receiving sections 103, a baseband signal processing section 104, a call processing section 105 and a transmission path interface 106. Furthermore, each transmitting/receiving section 103 is configured of a transmitting section and a receiving section.

User data that is to be transmitted on the downlink from the radio base station 10 to the user terminal 20 is input from the host station apparatus 30, via the transmission path interface 106, into the baseband signal processing section 104.

In the baseband signal processing section 104, in regard to the user data, signals are subjected to PDCP (Packet Data Convergence Protocol) layer processing, RLC (Radio Link Control) layer transmission processing such as division and coupling of user data and RLC retransmission control transmission processing, MAC (Medium Access Control) retransmission control (e.g., HARQ (Hybrid Automatic Repeat reQuest) transmission processing), scheduling, transport format selection, channel coding, inverse fast Fourier transform (IFFT) processing, and precoding processing, and resultant signals are transferred to the transmission/reception sections 103. Furthermore, in regard to downlink control signals, transmission processing is performed, including channel coding and inverse fast Fourier transform, and resultant signals are also transferred to the transmission/reception sections 103.

Each transmitting/receiving section 103 converts the baseband signals, output from the baseband signal processing section 104 after being precoded per each antenna, to a radio frequency band and transmits this radio frequency band. The radio frequency signals that are subject to frequency conversion by the transmitting/receiving sections 103 are amplified by the amplifying sections 102, and are transmitted from the transmission/reception antennas 101.

Whereas, in regard to the uplink signals, radio frequency signals received by each transmission/reception antenna 101 are amplified by each amplifying section 102. The transmitting/receiving sections 103 receive the uplink signals that are amplified by the amplifying sections 102, respectively. The transmitting/receiving sections 103 frequency-convert the received signals into baseband signals and the converted signals are then output to the baseband signal processing section 104.

Furthermore, each transmitting/receiving section (receiving section) 103 receives, from the user terminal 20, a capability that indicates whether or not DL reception and UL transmission can be performed in the same subframe. Capability can be, e.g., prescribed in "simultaneous Rx-Tx capability". Based on common recognition in the field of the art pertaining to the present invention, each transmitting/receiving section 103 can correspond to a transmitter/receiver, a transmitter/receiver circuit or a transmitter/receiver device.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on user data included in the input uplink signals. The signals are then transferred to the host station apparatus 30 via the transmission path interface 106. The call processing section 105 performs call processing such as setting up and releasing a communication channel, manages the state of the radio base station 10, and manages the radio resources.

The transmission path interface 106 performs transmission and reception of signals with the host station apparatus 30 via a predetermined interface. Furthermore, the transmission path interface 106 can perform transmission and reception of signals (backhaul signaling) with a neighboring radio base station 10 via an inter-base-station interface (for example, optical fiber, X2 interface).

Figure 12:
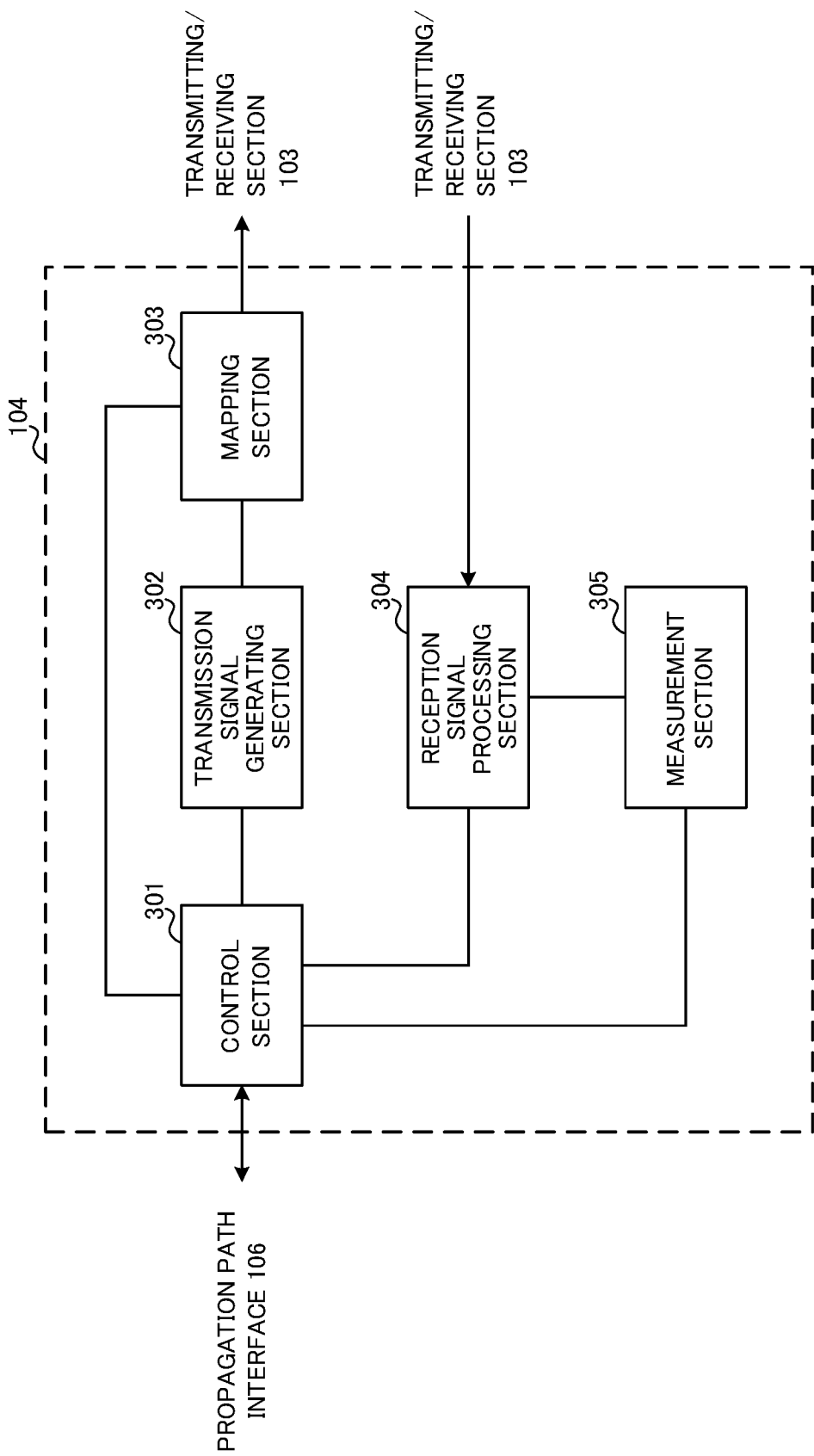
FIG. 12 is an illustrative diagram of a functional configuration of the radio base station according to the illustrated embodiment of the present invention.

FIG. 12 is a diagram illustrating the functional configurations of the radio base station according to the present embodiment. Note that although FIG. 12 mainly illustrates functional blocks of the features of the present embodiment, the radio base station 10 is also provided with other functional blocks that are necessary for carrying out radio communication. As illustrated in FIG. 12, the baseband signal processing section 104 includes a control section (scheduler) 301, a transmission signal generating section (generating section) 302, a mapping section 303, a reception signal processing section 304, and a measuring section 305.

The control section (scheduler) 301 controls scheduling (e.g., resource allocation) of downlink data signals to be transmitted on a PDSCH, and downlink control signals to be transmitted on either or both of PDCCH and enhanced PDCCH (EPDCCH). Furthermore, the control section 301 also controls the scheduling of system information, synchronization signals, paging information, CRS, and CSI-RS, etc.

The control section 301 also controls the scheduling of uplink reference signals, uplink data signals transmitted on a PUSCH, uplink control signals transmitted on a PUCCH and/or a PUSCH, and an random access preamble transmitted on a PRACH. Furthermore, the control section 301 controls the transmission of DL signals based on the listening (DL LBT) result.

When the control section 301 applies DL LBT to the CSI-RS transmission, a LBT can be applied that uses carrier sense (also called "CCA", "LBT", "listening"). Furthermore, the control section 301 may transmit signals by applying flexible duplex to the signals that are received/transmitted in/from the transmitting/receiving sections 103. Furthermore, signals may be transmitted by applying a partial subframe or a floating subframe, which are resource allocation methods performed by units of OFDM symbols. Furthermore, the control section 301 can schedule the user terminal 20. For example, the control section 301 may carry out radio resource scheduling in accordance with an operation of the user terminal 20 described in any of the first through fourth embodiments.

The transmission signal generating section 302 generates DL signals based on instructions from the control section 301, and outputs the generated signals to the mapping section 303. For example, the transmission signal generating section 302 generates, based on instructions from the control section 301, a DL assignment that notifies downlink signal allocation information, and a UL grant that notifies uplink signal allocation information. Furthermore, the transmission signal generating section 302 can include information related to a UL transmission LBT in the DL signal that is transmitted in an unlicensed band. Furthermore, the transmission signal generating section 302 can include information, in the UL grant, related to whether or not a UL-LBT is applied. Based on common recognition in the field of the art pertaining to the present invention, the downlink control signal generating section 302 can correspond to a signal generator or a signal generating circuit.

Based on instructions from the control section 301, the mapping section 303 maps the downlink signal generated in the transmission signal generating section 302 to predetermined radio resources to output to the transmitting/receiving sections 103. Based on common recognition in the field of the art pertaining to the present invention, the mapping section 303 can correspond to a mapping circuit and a mapper.

The reception signal processing section 304 performs a receiving process (e.g., demapping, demodulation, and decoding, etc.) on UL signals (e.g., a delivery acknowledgement signal (HARQ-ACK), data signals transmitted on the PUSCH) transmitted from the user terminal. Furthermore, the result of this process is output to the control section 301. Based on common recognition in the field of the art pertaining to the present invention, the reception signal processing section 304 can correspond to a signal processor, a signal processing circuit, or a signal processing device; or can be configured as a measurer, a measuring circuit or a measuring device.

The measuring section 305 can measure, using the received signals, the reception power (e.g., RSRP (Reference Signal Received Power)), the reception quality (RSRQ (Reference Signal Received Quality)), and the channel state (CSI), etc. Furthermore, the measuring section 305 can measure the reception power of a signal transmitted from a system, etc., in a listening process that is performed before transmission of a DL signal in an unlicensed band. The results measured by the measuring section 305 are output to the control section 301. The control section 301 can control the DL signal transmission based on the measurement result (listening result) by the measuring section 305.

Based on common recognition in the field of the art pertaining to the present invention, the measuring section 305 can correspond to a measurer, a measuring circuit or a measuring device.

<User Terminal>

Figure 13:
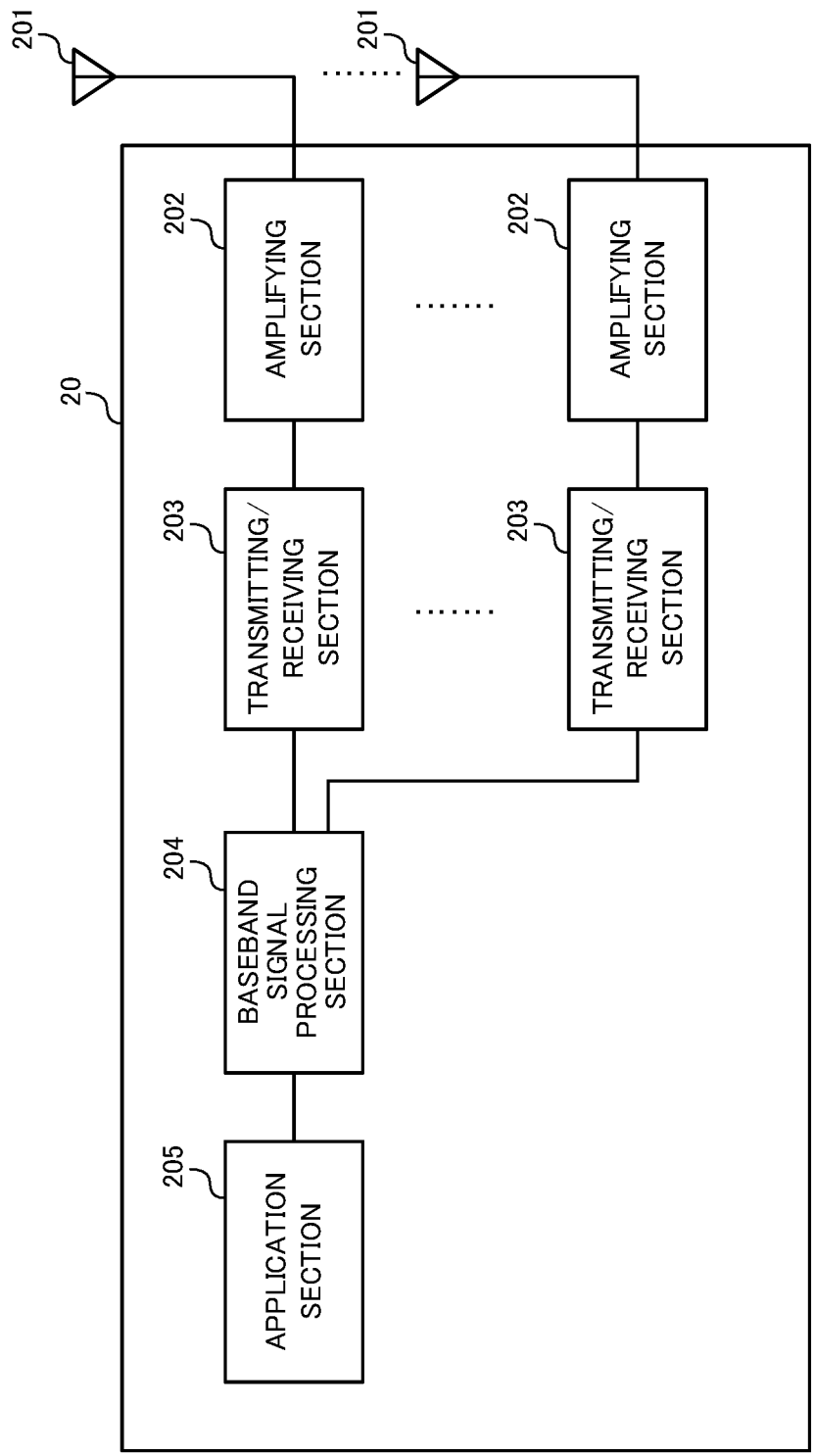
FIG. 13 is an illustrative diagram of an overall configuration of a user terminal according to the illustrated embodiment of the present invention.

FIG. 13 is a diagram illustrating an overall structure of a user terminal according to the present embodiment. The user terminal 20 is provided with a plurality of transmitting/receiving antennas 201 for MIMO communication, amplifying sections 202, transmitting/receiving sections 203, a baseband signal processing section 204 and an application section 205. Note that each transmitting/receiving section 203 may be configured of a transmitting section and a receiving section.

Radio frequency signals that are received in the plurality of transmitting/receiving antennas 201 are respectively amplified in the amplifying sections 202. Each transmitting/receiving section 203 receives a downlink signal that has been amplified by an associated amplifying section 202. The transmitting/receiving sections 203 perform frequency conversion on the reception signals to convert into baseband signals, and are thereafter output to the baseband signal processing section 204.

The input baseband signal is subjected to an FFT process, error correction decoding, a retransmission control receiving process, etc., in the baseband signal processing section 204. The downlink user data is forwarded to the application section 205. The application section 205 performs processes related to higher layers above the physical layer and the MAC layer. Furthermore, out of the downlink data, broadcast information is also forwarded to the application section 205.

On the other hand, uplink user data is input to the baseband signal processing section 204 from the application section 205. In the baseband signal processing section 204, a retransmission control transmission process (e.g., a HARQ transmission process), channel coding, precoding, a discrete fourier transform (DFT) process, an inverse fast fourier transform (IFFT) process, etc., are performed, and the result is forwarded to each transmitting/receiving section 203. The baseband signal that is output from the baseband signal processing section 204 is converted into a radio frequency band in the transmitting/receiving sections 203. Thereafter, the amplifying sections 202 amplify the radio frequency signal having been subjected to frequency conversion, and transmit the resulting signal from the transmitting/receiving antennas 201.

Figure 14:
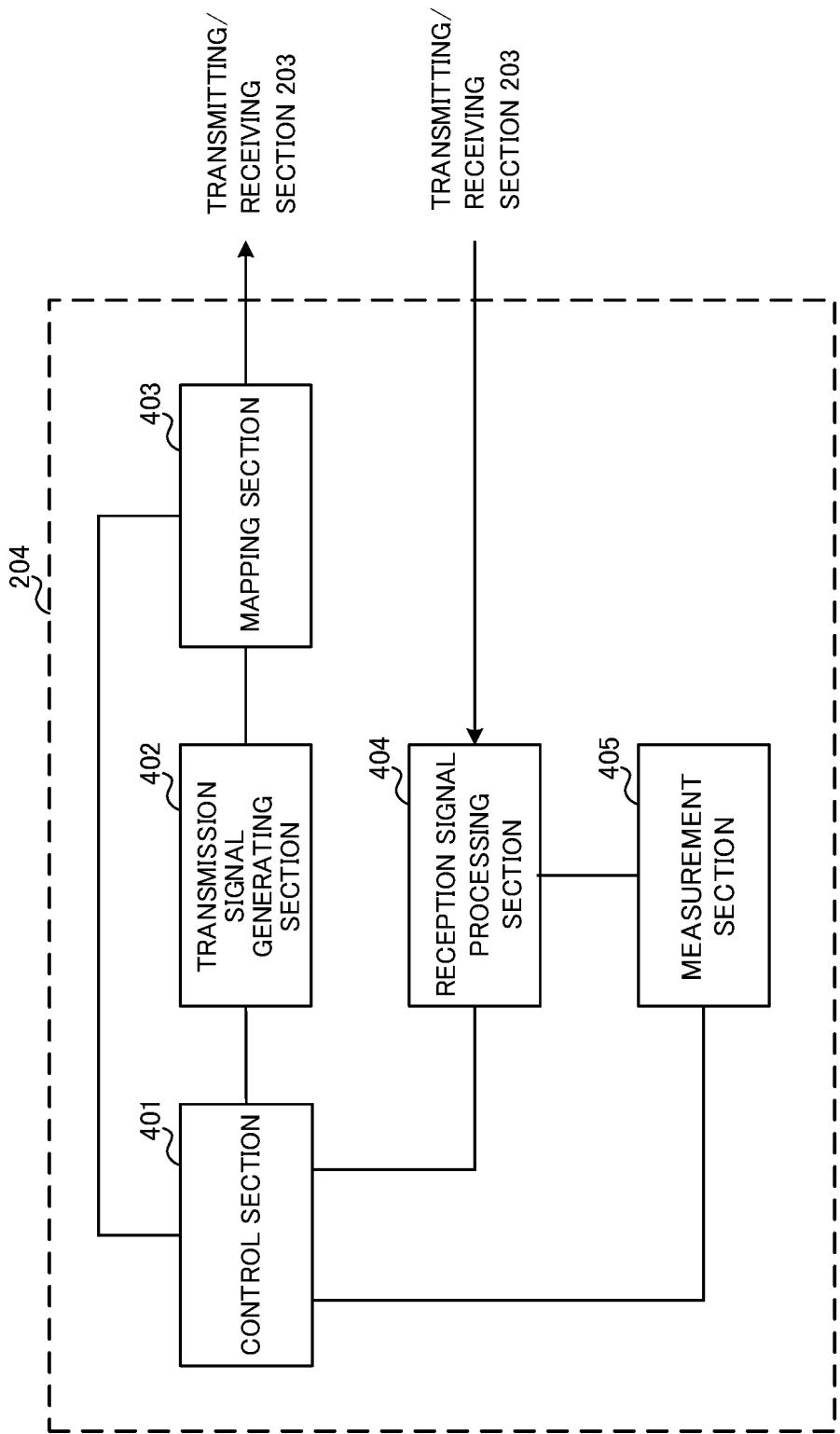
FIG. 14 is an illustrative diagram of a functional configuration of the user terminal according to the illustrated embodiment of the present invention.

FIG. 14 is a diagram illustrating the functional configurations of the user terminal according to the present embodiment. Note that FIG. 14 mainly illustrates functional blocks of the features of the present embodiment; the user terminal 20 is also provided with other functional blocks that are necessary for carrying out radio communication. As illustrated in FIG. 14, the baseband signal processing section 204 provided in the user terminal 20 includes a control section 401, a transmission signal generating section 402, a mapping section 403, a reception signal processing section 404, and a measuring section 405.

The control section 401 can control the transmission signal generating section 402, the mapping section 403 and the reception signal processing section 404. For example, the control section 401 obtains the downlink control signals (signals transmitted on a PDCCH/EPDCCH) and the downlink data signals (signals transmitted on a PDSCH), which were transmitted from the radio base station 10, from the reception signal processing section 404. The control section 401 controls the generation/transmission of the uplink control signals (e.g., delivery acknowledgement signals (HARQ-ACK), etc.) and the uplink data signals based on the determination result of whether or not a retransmission control is necessary for the downlink control signals (UL grant) and the downlink data signals. Furthermore, the control section 401 controls the UL signal transmission based on the listening (UL LBT) results.

Furthermore, in the case where CA is carried out with the radio base station 11 as the Pcell and the radio base station 12 as the Scell, the control section 401 may perform the following control. The control section 401 may control or assume communication with the radio base station 12 in accordance with the type of UL/DL of the signal that is transmitted from the radio base station 11. For example, if a DL is received from the radio base station 11, the control section 401 may control the radio base station 12 to not transmit a UL. Furthermore, if a DL is received from the radio base station 11, the control section 401 may assume to transmit a DL to the radio base station 12. Furthermore, if a DL is received from the radio base station 11, the control section 401 may assume that a UL will not be transmitted to the radio base station 12. Furthermore, if a UL is transmitted from the radio base station 11, the control section 401 may perform a control so as not to receive a DL from the radio base station 12. If a UL is transmitted from the radio base station 11, the control section 401 may assume to transmit a UL to the radio base station 12. Furthermore, a UL is transmitted from the radio base station 11, the control section 401 may assume that a DL will not be received from the radio base station 12. Furthermore, the control section 401 does not need to carry out transmission in the Scell in a time interval that corresponds to a guard period of a special subframe of the Pcell.

Based on common recognition in the field of the art pertaining to the present invention, the control section 401 can correspond to a controller, a control circuit or a control device.

The transmission signal generating section 402 generates UL signals based on instructions from the control section 401, and outputs these UL signals to the mapping section 403. For example, the transmission signal generating section 402 generates uplink control signals, such as a delivery acknowledgement signal (HARQ-ACK) and channel state information (CSI), etc., based on instructions from the control section 401.

Furthermore, the transmission signal generating section 402 generates uplink data signals based on instructions from the control section 401. For example, in the case where a UL grant is included in the downlink control signal that is notified from the radio base station 10, the control section 401 instructs the transmission signal generating section 402 to generate an uplink data signal. Based on common recognition in the field of the art pertaining to the present invention, the transmission signal generating section 402 can correspond to a signal generator, a signal generating circuit, or a signal generating device.

The mapping section 403 maps the uplink signal (uplink control signal and/or uplink data) generated by the transmission signal generating section 402, based on instructions from the control section 401, to radio resources and outputs the generated signal to the transmitting/receiving sections 203. Based on common recognition in the field of the art pertaining to the present invention, the mapping section 403 can correspond to a mapper, a mapping circuit or a mapping device.

The reception signal processing section 404 performs reception processing (e.g., demapping, demodulation, decoding, etc.) on the DL signals (e.g., a downlink control signal transmitted from the radio base station on a PDCCH/EPDCCH, downlink data signals transmitted on the PDSCH, etc.). The reception signal processing section 404 outputs the information received from the radio base station 10 to the control section 401 and the measuring section 405. Based on common recognition in the field of the art pertaining to the present invention, the reception signal processing section 404 can correspond to a signal processor, a signal processing circuit, or a signal processing device. Furthermore, the reception signal processing section 404 can be configured as a receiving section pertaining to the present invention.

Furthermore, the measuring section 405 measures the channel state using a reference signal for measuring channel-state information transmitted from the radio base station 10. Furthermore, the measuring section 405 may use the received signals to measure the received power (e.g., RSRP (Reference Signal Received Power)), received quality (RSRQ (Reference Signal Received Quality)), and the channel state, etc. Furthermore, in the listening that is performed before a UL signal is transmitted in an unlicensed band, the measuring section 405 can measure the received power of the signal that is transmitted from another system, etc. The result of the measurement by the measuring section 405 is output to the control section 401. The control section 401 can control the UL signal transmission based on the measured result (listening result) of the measuring section 405.

Based on common recognition in the field of the art pertaining to the present invention, the measuring section 405 can correspond to a measurer, a measuring circuit, or a measuring device.

Furthermore, the block diagrams used in the above description of the present embodiment indicate function-based blocks. These functional blocks (configured sections) are implemented via a combination of hardware and software. Furthermore, the implementation of each functional block is not limited to a particular means. In other words, each functional block may be implemented by a single device that is physically connected, or implemented by two or more separate devices connected by a fixed line or wirelessly connected.

For example, some or all of the functions of the radio base station 10 and the user terminal 20 may be implemented by using hardware such as ASICs (Application Specific Integrated Circuits), PLDs (Programmable Logic Devices) and FPGAs (Field Programmable Gate Arrays), etc. Furthermore, the radio base station 10 and the user terminal 20 may be each implemented by a computer device that includes a processor (CPU: Central Processing Unit), a communication interface for connecting to a network, a memory and a computer-readable storage medium that stores a program(s). In other words, the radio communication system and the user terminal, etc., pertaining to the embodiment of the present invention may function as a computer that performs processes of the radio communication method pertaining to the present invention.

The processor and memory, etc., are connected to buses for communication of information. Furthermore, the computer-readable storage medium includes, e.g., a flexible disk, a magnetic-optical disk, ROM (Read Only Memory), EPROM (Erasable Programmable ROM), CD-ROM (Compact Disc-ROM), RAM (Random Access Memory), or a hard disk, etc. Furthermore, a program may be transmitted from a network via electric telecommunication lines. Furthermore, the radio base station 10 and the user terminal 20 may also include an input device such as input keys, and an output device such as a display.

The functional configurations of the radio base station 10 and the user terminal 20 may be implemented using the above-mentioned hardware, may be implemented using software modules that are run by a processor, or may be implemented using a combination of both thereof. The processor controls the entire user terminal by operating an operating system. Furthermore, the processor reads a programs, software modules and data from the storage medium into a memory, and performs the various processes thereof accordingly.

The above-mentioned program only needs to be a program that can perform the operations described in the above embodiment on a computer. For example, the control section 401 of the user terminal 20 may be stored in the memory, and implemented by the processor operating a control program, and the other above-mentioned functional blocks can also be implemented in the same manner.

Furthermore, software and commands, etc., may be transmitted/received via a transmission medium. For example, in the case where software is transmitted from a website, server or other remote source by using fixed-line technology, such as coaxial cable, optical fiber cable, twisted-pair wire and digital subscriber's line (DSL), etc., and/or wireless technology, such as infrared, radio and microwaves, etc., such fixed-line technology and wireless technology are included within the definition of a transmission medium.

Note that technical terms discussed in the present specification and/or technical terms necessary for understanding the present specification may be replaced with technical terms having the same or similar meaning. For example channel and/or symbol may be signals (signaling). Furthermore, a signal may be a message. Furthermore, component carrier (CC) may be called a carrier frequency or cell, etc.

Furthermore, information and parameters, etc., discussed in the present specification may be expressed as absolute values, or as a relative value with respect to a predetermined value, or expressed as other corresponding information. For example, a radio resource may be indicated as an index.

Information and signals, etc., discussed in the present specification may be expressed using any one of various different technologies. For example, data, instructions, commands, information, signals, bits, symbols, chips, etc., that could be referred to throughout the above description may be expressed as voltage, current, electromagnetic waves, a magnetic field or magnetic particles, optical field or photons, or a desired combination thereof.

The above-described aspects/embodiments of the present invention may be used independently, used in combination, or may be used by switching therebetween when being implemented. Furthermore, notification of predetermined information (e.g., notification of "is X") does not need to be explicit, but may be implicitly (e.g., by not notifying the predetermined information) carried out.

Notification of information is not limited to the aspects/embodiments of the present invention, such notification may be carried out via a different method. For example, notification of information may be implemented by physical layer signaling (e.g., DCI (Downlink Control Information), UCI (Uplink Control Information)), higher layer signaling (e.g., RRC (Radio Resource Control) signaling, MAC (Medium Access Control) signaling, broadcast information (MIB (Master Information Block), SIB (System Information Block))), by other signals or a combination thereof. Furthermore, RRC signaling may be called a "RRC message" and may be, e.g., an RRC connection setup (RRCConnectionSetup) message, or an RRC connection reconfiguration (RRCConnectionReconfiguration) message, etc.

The above-described aspects/embodiments of the present invention may be applied to a system that utilizes LTE (Long Term Evolution), LTE-A (LTE-Advanced), SUPER 3G, IMT-Advanced, 4G, 5G, FRA (Future Radio Access), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other suitable systems and/or to an enhanced next-generation system that is based on any of these systems.

The order of processes, sequences and flowcharts, etc., in the above-described aspects/embodiments of the present invention can have a switched order so long no contradictions occur. For example, each method described in the present specification proposes an example of an order of various steps but are not limited to the specified order thereof.

Hereinabove, the present invention has been described in detail by use of the foregoing embodiments. However, it is apparent to those skilled in the art that the present invention should not be limited to the embodiment described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

The disclosure of Japanese Patent Application No. 2015-159985, filed on Aug. 13, 2015, the content of which being incorporated herein by reference in its entirety.

The invention claimed is:

1. A terminal comprising:
a transmitter that transmits an uplink signal;
a receiver that receives a downlink signal; and
a processor that controls communication in the transmitter and in the receiver, wherein the processor performs communication with a first cell and a second cell where a part of symbols on the first cell is configured as uplink and another part of the symbols on the first cell is configured as downlink,
when a first symbol on the second cell overlaps a second symbol on the first cell, the first symbol is shorter than a subframe, and the second symbol on the first cell is configured as downlink, the processor allows reception on the first symbol on the second cell and does not allow transmission on the first symbol on the second cell,
when a third symbol on the second cell overlaps a fourth symbol on the first cell, the third symbol is shorter than the subframe, and the fourth symbol on the first cell is configured as uplink, the processor allows transmission on the third symbol on the second cell and does not allow reception on the third symbol on the second cell, and
when a set of symbols on the second cell overlaps a fifth symbol on the first cell, the set of symbol is shorter than the subframe, and the fifth symbol on the first cell is configured as uplink, the processor allows transmission on the set of symbols on the second cell and does not allow reception on the set of symbols on the second cell.

2. The terminal according to claim 1, wherein the processor assumes that the third symbol on the second cell is used only for uplink communication, and the processor assumes that the first symbol on the second cell is used only for downlink communication.

3. The terminal according to claim 1, wherein the set of symbols are longer than the fifth symbol.

4. The terminal according to claim 1, wherein the transmitter transmits the uplink signal of the second cell on a symbol other than the first symbol on the second cell, and the receiver receives the downlink signal of the second cell on a symbol other than the third symbol and the set of symbols on the second cell.

5. The terminal according to claim 1, wherein the terminal is not capable of simultaneous transmission and reception with the first cell and the second cell.

6. The terminal according to claim 1, wherein the terminal supports halfduplex operation with the first cell and the second cell so as to perform communication with the first cell and second cell.

7. A system comprising:
a terminal that comprises:
a transmitter that transmits an uplink signal;
a receiver that receives a downlink signal; and
a processor that controls communication in the transmitter and in the receiver, wherein the processor performs communication with a first cell and a second cell where a part of symbols on the first cell is configured as uplink and another part of the symbols on the first cell is configured as downlink,
when a first symbol on the second cell overlaps a second symbol on the first cell, the first symbol is shorter than a subframe, and the second symbol on the first cell is configured as downlink, the processor allows reception on the first symbol on the second cell and does not allow transmission on the first symbol on the second cell,
when a third symbol on the second cell overlaps a fourth symbol on the first cell, the third symbol is shorter than the subframe, and the fourth symbol on the first cell is configured as uplink, the processor allows transmission on the third symbol on the second cell and does not allow reception on the third symbol on the second cell, and
when a set of symbols on the second cell overlaps a fifth symbol on the first cell, the set of symbol is shorter than the subframe, and the fifth symbol on the first cell is configured as uplink, the processor allows transmission on the set of symbols on the second cell and does not allow reception on the set of symbols on the second cell, and
a base station that comprises:
a receiver that receives the uplink signal on the second cell; and
a transmitter that transmits the downlink signal on the second cell.

8. A radio communication method for a terminal comprising:
communicating with a first cell and a second cell where a part of symbols on the first cell is configured as uplink and another part of the symbols on the first cell is configured as downlink,
when a first symbol on the second cell overlaps a second symbol on the first cell, the first symbol is shorter than a subframe, and the second symbol on the first cell is configured as downlink, allowing reception on the first symbol on the second cell and not allowing transmission on the first symbol on the second cell,
when a third symbol on the second cell overlaps a fourth symbol on the first cell, the third symbol is shorter than the subframe, and the fourth symbol on the first cell is configured as uplink, allowing transmission on the third symbol on the second cell and not allowing reception on the third symbol on the second cell, and
when a set of symbols on the second cell overlaps a fifth symbol on the first cell, the set of symbol is shorter than the subframe, and the fifth symbol on the first cell is configured as uplink, allowing transmission on the set of symbols on the second cell and not allowing reception on the set of symbols on the second cell.

* * * * *